(12) United States Patent
Hoshizuki et al.

(10) Patent No.: US 11,368,279 B2
(45) Date of Patent: Jun. 21, 2022

(54) PROCESSING APPARATUS, PROCESSING METHOD, STORAGE MEDIUM, AND ENCRYPTION PROCESSING SYSTEM

(71) Applicant: AXELL CORPORATION, Tokyo (JP)

(72) Inventors: Yusuke Hoshizuki, Tokyo (JP); Masashi Michigami, Tokyo (JP)

(73) Assignee: AXELL CORPORATION, Tokyo (JP)

( * ) Notice: Subject to any disclaimer, the term of this patent is extended or adjusted under 35 U.S.C. 154(b) by 853 days.

(21) Appl. No.: 16/227,217

(22) Filed: Dec. 20, 2018

(65) Prior Publication Data
US 2019/0199510 A1   Jun. 27, 2019

(30) Foreign Application Priority Data
Dec. 25, 2017   (JP) .............................. JP2017-248185

(51) Int. Cl.
*H04L 9/00* (2022.01)
*G06N 3/08* (2006.01)
(Continued)

(52) U.S. Cl.
CPC .............. *H04L 9/008* (2013.01); *G06N 3/04* (2013.01); *G06N 3/0454* (2013.01);
(Continued)

(58) Field of Classification Search
CPC ..................................................... H04L 9/008
See application file for complete search history.

(56) References Cited

U.S. PATENT DOCUMENTS

2011/0135096 A1\* 6/2011 Rane ...................... H04L 9/008
380/278

2013/0148868 A1\* 6/2013 Troncoso Pastoriza ......................
G06K 9/00885
382/118
(Continued)

FOREIGN PATENT DOCUMENTS

WO          2016/039651       3/2016

OTHER PUBLICATIONS

Office Action dated Mar. 17, 2020 in corresponding Japanese Patent Application No. 2017-248185; with English Translation.
(Continued)

*Primary Examiner* — Simon P Kanaan
(74) *Attorney, Agent, or Firm* — Wenderoth, Lind & Ponack, L.L.P.

(57) ABSTRACT

A processing apparatus includes at least one processor configured to function as: an input unit that receives encrypted data based on homomorphic encryption as an input; and a process execution unit that executes a predetermined process by using the encrypted data while maintaining a secret state by encryption and includes one or more processing units. At least one of the processing units is a multiplication corresponding processing unit for executing a calculation in a ciphertext space corresponding to a processing of multiplying plaintext data by a predetermined multiplier. The multiplication corresponding processing unit executes a calculation in the ciphertext space corresponding to a calculation of multiplying the plaintext data by an adjustment multiplication value on first encrypted data input from a preceding stage and outputs resulting data. The adjustment multiplication value is obtained by multiplying the predetermined multiplier by a predetermined adjustment value for the multiplication corresponding processing unit and by performing an integer processing.

11 Claims, 7 Drawing Sheets

(51) Int. Cl.
*G06N 3/04* (2006.01)
*G06N 3/063* (2006.01)

(52) U.S. Cl.
CPC ............ *G06N 3/0481* (2013.01); *G06N 3/08* (2013.01); *G06N 3/063* (2013.01); *H04L 2209/12* (2013.01)

(56) References Cited

U.S. PATENT DOCUMENTS

| | | | |
|---|---|---|---|
| 2013/0333051 A1* | 12/2013 | Takenouchi | G06F 21/60 726/26 |
| 2014/0185797 A1* | 7/2014 | Yasuda | H04L 9/008 380/44 |
| 2016/0350648 A1* | 12/2016 | Gilad-Bachrach | G06N 3/08 |
| 2017/0004324 A1* | 1/2017 | Seo | G06F 21/6227 |
| 2019/0386814 A1* | 12/2019 | Ahmed | H04L 9/3013 |
| 2020/0242466 A1* | 7/2020 | Mohassel | G06F 21/6254 |

OTHER PUBLICATIONS

Kuri, S. et al., "Privacy Preserving Extreme Learning Machine Using Additively Homomorphic Encryption", Extreme Learning Machine, Computer Security Symposium, Oct. 2017, vol. 2017 No. 2, pp. 781-788.

Orlandi et al., "Oblivious Neural Network Computing via Homomorphic Encryption", EURASIP Journal on Information Security, vol. 2007, Article ID 37343, pp. 1-11 (2007).

* cited by examiner

PROCESSING APPARATUS, PROCESSING METHOD, STORAGE MEDIUM, AND ENCRYPTION PROCESSING SYSTEM

CROSS-REFERENCE TO RELATED APPLICATIONS

This application is based on and claims priority under 35 USC 119 from Japanese Patent Application No. 2017-248185 filed on Dec. 25, 2017, the entire content of which is incorporated herein by reference.

BACKGROUND

Technical Field

The embodiments discussed herein relate to a processing apparatus for processing information using homomorphic encryption.

Related Art

Recognition processing (inference processing) of images, characters, voices, and the like has been performed by using a neural network model (artificial neural network) which is one of architectures of machine learning.

Learned coefficient data in the neural network model has a large scale. There may be a problem that the load to execute a processing is too large and that it is difficult to execute the processing only with a client device. On the other hand, there is a need for using a client-server model to use cloud resources capable of large-scale computations for an inference processing or the like by using the neural network model.

When using the client-server model, data are transmitted from a client to a server. There may be concern about a leakage of highly confidential information such as personal information.

To address the above-mentioned matter, transmitting encrypted data to the server and processing the encrypted data on the server side by using homomorphic encryption that allows computation on ciphertext is conceivable.

However, general activation functions such as a sigmoid function and a Rectified Linear Unit (ReLU) used in the neural network model exceed categories of calculations which can be performed by the known homomorphic encryption. Thus, it is impossible to calculate the encrypted data based on the homomorphic encryption.

For example, PTL 1 discloses a technique relating to a neural network using an approximate polynomial as an activation function.

NPL 1 discloses a technique for realizing a process using homomorphic encryption by querying a client each time when calculating an activation function in a neural network model.

PTL 1: U.S. Patent Application Publication No. 2016/0350648

NPL 1: C. Orlandi, A. Piva, and M. Barni Research Article Oblivious Neural Network Computing via Homomorphic Encryption, Internet <http://clem.dii.unisi.it/~vipp/files/publications/S1687416107373439.pdf>

SUMMARY

In the neural network model, it may be difficult to process the encrypted data as it is, or a processing load may become large. For example, in the technique disclosed in NPL 1, exchange of data with the client and the process on the client side occurs every time the activation function is calculated, which results in an increasing communication volume and longer processing time.

In addition, using completely homomorphic encryption that is homomorphic encryptions capable of handling more calculations, somewhat homomorphic encryption, or the like may be considered. However, the encrypted data by such encryptions has a large amount of data, and thus, there is a problem that the processing load becomes large.

In terms of reducing the processing load, it is preferable to perform a process by using additive homomorphic encryption. However, in the case of using the additive homomorphic encryption, available calculations are limited, and thus the executable process is limited. For example, if the additive homomorphic encryption is used, a process for executing a process of multiplying by a number other than an integer (including, for example, multiplication of a number less than 1 (corresponding to division)) cannot be executed.

In addition, in a case where the process is performed by using the additive homomorphic encryption, there is a problem that the process that can be executed are not only limited in a process using the neural network model but also similarly limited in a process not using the neural network model.

An aspect of the present embodiments may provide a technique capable of executing a wider processing by using encrypted data based on homomorphic encryption.

According to an aspect of the embodiments, there is provided a processing apparatus including at least one processor configured to function as: an input unit that receives encrypted data based on homomorphic encryption as an input; and a process execution unit that executes a predetermined process by using the encrypted data while maintaining a secret state by encryption and includes one or more processing units, wherein at least one of the processing units is a multiplication corresponding processing unit for executing a calculation in a ciphertext space corresponding to a processing of multiplying plaintext data by a predetermined multiplier, and the multiplication corresponding processing unit executes a calculation in the ciphertext space corresponding to a calculation of multiplying the plaintext data by an adjustment multiplication value on first encrypted data input from a preceding stage and outputs resulting data, the adjustment multiplication value being obtained by multiplying the predetermined multiplier by a predetermined adjustment value for the multiplication corresponding processing unit and by performing an integer processing.

In the processing apparatus, the at least one processor may further be configured to function as a multiplier reception unit that receives the predetermined multiplier, and a multiplication value adjustment unit that calculates the adjustment multiplication value by multiplying the predetermined multiplier received by the predetermined adjustment value.

In the processing apparatus, the at least one processor may further be configured to function as an adjustment multiplication value reception unit that receives the adjustment multiplication value obtained by multiplying the predetermined multiplier by the predetermined adjustment value.

In the processing apparatus, the predetermined multiplier may be a number in a floating-point format, the predetermined adjustment value may be an integer of a power of 2, and the adjustment multiplication value may be an integer obtained by converting the predetermined multiplier into a fixed point format and multiplying the predetermined multiplier converted into the fixed point format by the predetermined adjustment value.

In the processing apparatus, the one or more processing units may be one or more processing unit constituting a neural network model.

In the processing apparatus, the homomorphic encryption may be additive homomorphic encryption.

According to another aspect of the embodiments, there is provided a processing method by a processing apparatus for executing a predetermined process by using encrypted data based on homomorphic encryption as an input while maintaining a secret state by encryption, the processing method including: executing a calculation in a ciphertext space corresponding to a calculation of multiplying plaintext data by an adjustment multiplication value on first encrypted data input from a preceding stage to execute a calculation in the ciphertext space corresponding to a processing of multiplying the plaintext data by a predetermined multiplier, the adjustment multiplication value being obtained by multiplying the predetermined multiplier by a predetermined adjustment value and by performing integer processing; and outputting resulting data.

According to another aspect of the embodiments, there is provided a non-transitory computer readable storage medium storing a processing program causing a computer to execute a process, the computer including at least one processor configured to function as an input unit that receives encrypted data based on homomorphic encryption as an input and a process execution unit that executes a predetermined process by using the encrypted data while maintaining a secret state by encryption and includes one or more processing units at least one of which is a multiplication corresponding processing unit for executing a calculation in a ciphertext space corresponding to a processing of multiplying plaintext data by a predetermined multiplier, the process including: executing a calculation in a ciphertext space corresponding to a calculation of multiplying plaintext data by an adjustment multiplication value on first encrypted data input from a preceding stage to execute a calculation in the ciphertext space corresponding to a processing of multiplying the plaintext data by a predetermined multiplier, the adjustment multiplication value being obtained by multiplying the predetermined multiplier by a predetermined adjustment value for the multiplication corresponding processing unit and by performing integer processing; and outputting resulting data.

According to another aspect of the embodiments, there is provided an encryption processing system including: a processing apparatus for executing a predetermined process by using encrypted data based on homomorphic encryption as an input while maintaining a secret state by encryption; and a result generation apparatus for executing a process for generating a result corresponding to first plaintext data by using a processing result by the processing apparatus as an input, wherein the processing apparatus includes at least one processor configured to function as an input unit that receives the encrypted data, and a process execution unit that executes the predetermined process by using the encrypted data and includes one or more processing units at least one of which is a multiplication corresponding processing unit for executing a calculation in a ciphertext space corresponding to a processing of multiplying the first plaintext data by a predetermined multiplier, the multiplication corresponding processing unit executing a calculation in the ciphertext space corresponding to a calculation of multiplying the first plaintext data by an adjustment multiplication value on first encrypted data input from a preceding stage and outputs resulting data, the adjustment multiplication value being obtained by multiplying the predetermined multiplier by a predetermined adjustment value for the multiplication corresponding processing unit and by performing an integer processing, and the result generation apparatus includes at least one processor configured to function as a processing result reception unit that receives the processing result by the process execution unit of the processing apparatus, a decryption unit configured to decrypt the processing result to obtain second plaintext data, and an adjustment removal processing unit that generates the result by executing a process of removing adjustment on the second plaintext data based on the predetermined adjustment value for the multiplication corresponding processing unit of the process execution unit.

According to the embodiments, a wider processing may be executed by using encrypted data based on homomorphic encryption.

DETAILED DESCRIPTION

Embodiments will be described with reference to the drawings. In addition, embodiments described below do not limit the invention according to the claims, and all elements and combination thereof described in the embodiments are not always essential.

First, a processing system according to an embodiment will be described.

Figure 1:
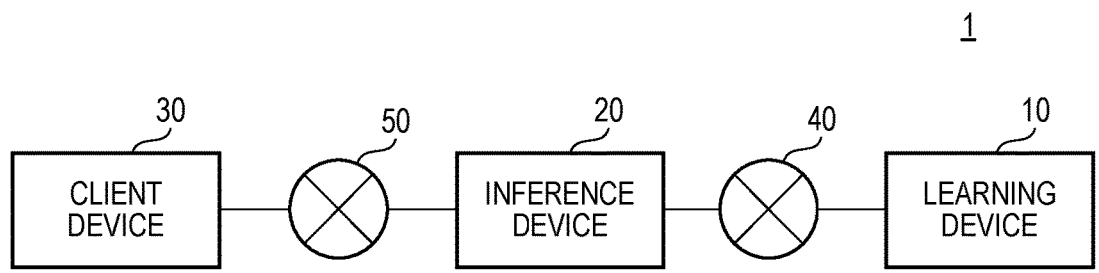
FIG. 1 is an overall configuration diagram illustrating a processing system according to an embodiment.

FIG. 1 is an overall configuration diagram illustrating the processing system according to the embodiment.

The processing system 1 is an example of an encryption processing system and includes a learning device 10, an inference device 20 as an example of a processing apparatus, and a client device 30 as an example of a result generation device. The learning device 10 and the inference device 20 are connected via a network 40. In addition, the inference device 20 and the client device 30 are connected via a network 50. The networks 40 and 50 are, for example, a local area network (LAN), a wide area network (WAN), or the like. In addition, in FIG. 1, the network 40 and the network 50 are separate networks, but the network 40 and the network 50 may be the same network.

The learning device 10 performs learning of a neural network model. The inference device 20 sets the neural network model based on the learning result (setting values such as coefficients (weights and biases) of the neural network model) of the neural network model by the learning device 10 and performs an inference processing. The client device 30 is, for example, a device used by a user, encrypts and transmits data (target data) to be subjected to the inference processing to the inference device 20, and receives the result (inference result) of the inference processing by the inference device 20.

Figure 2:
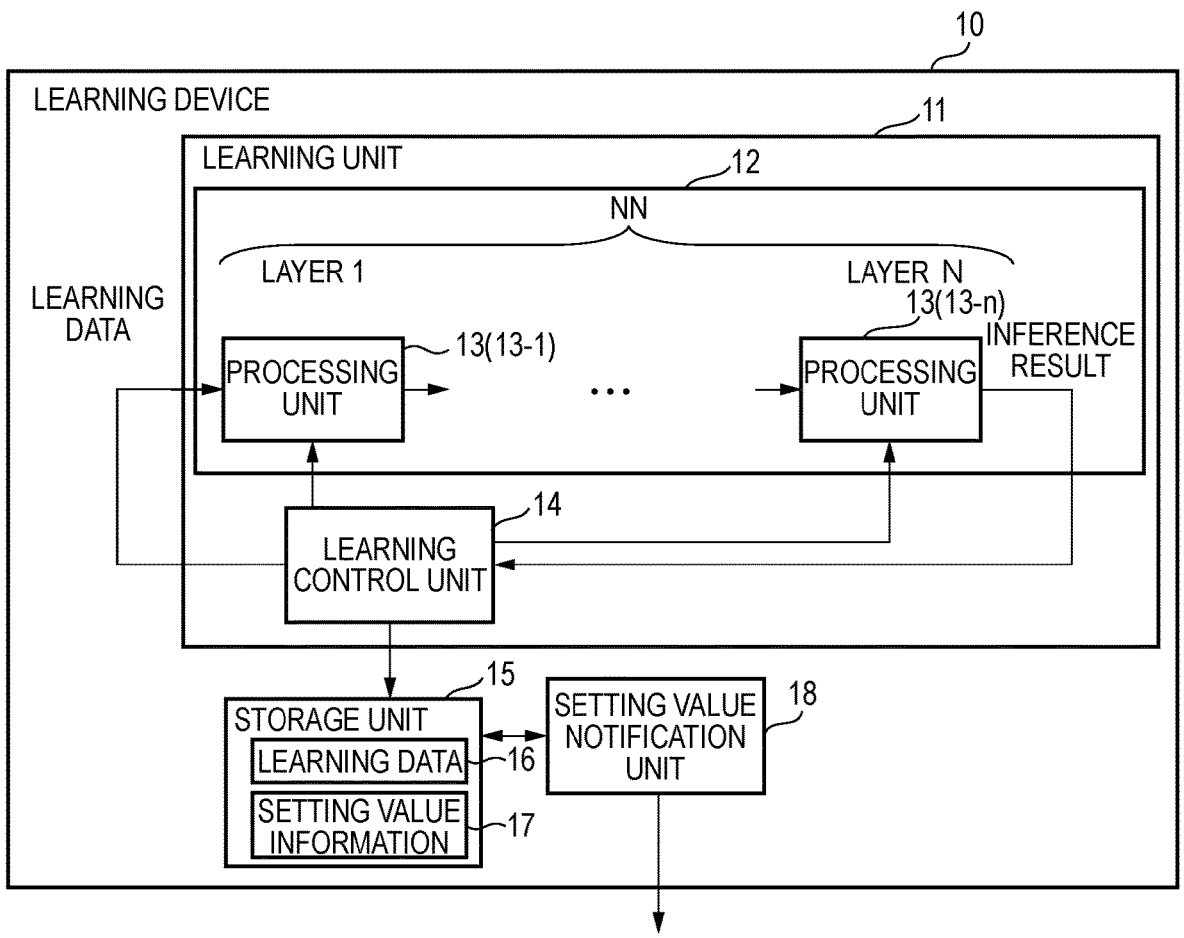
FIG. 2 is a functional configuration diagram illustrating a learning device according to the embodiment.

FIG. 2 is a functional configuration diagram of the learning device according to the first embodiment.

The learning device 10 includes a learning unit 11, a storage unit 15, and a setting value notification unit 18.

The learning unit 11 includes a neural network model 12 and a learning control unit 14.

The neural network model 12 is, for example, a neural network model for executing a predetermined inference processing and outputting the inference result. The neural network model 12 includes one or more processing layers (layers). In addition, in the embodiment, the neural network model 12 is used for learning of the setting values. In the example of FIG. 2, the neural network model 12 includes layers 1 to N (N is an integer of 1 or more). A process (partial process) in each layer is executed by each processing unit 13. The neural network model 12 may be, for example, a model of executing the inference processing for inferring what image data to be processed represents (for example, which of a person, a dog, a cat, and the like is included) and outputting the inference result. The number of layers in the neural network model 12 and the type and content of the partial process to be executed in each layer can be arbitrarily set.

As the processing unit 13 in the layer of the neural network model 12, for example, there are a convolution processing unit for performing a convolution process on input image data by using each of a plurality of pieces of filter data (an example of the setting values), an activation function unit for executing a process for converting input data by an activation function, a pooling processing unit for executing a process for down-sampling the input data, an affine processing unit for executing an affine conversion process on the input data, and a SoftMax processing unit for executing a process by a SoftMax function on the input data.

The learning control unit 14 receives learning data 16 stored in the storage unit 15, inputs the learning data 16 to the neural network model 12, and learns the setting values of the neural network model 12 based on the inference result output from the neural network model 12. When the learning by the learning data 16 is completed, the learning control unit 14 stores information on the setting values obtained by the learning in the storage unit 15.

The storage unit 15 stores the learning data 16 used for the learning of the neural network model 12 of the learning unit 11 and setting value information 17 that is information on the setting values such as the coefficients of the neural network model 12. In addition, the learning data 16 may be stored in the storage unit 15 as teacher data associated with the inference result data corresponding to the learning data 16. The learning data 16 may be, for example, unencrypted data (plaintext data). As the setting values included in the setting value information 17, there are, for example, coefficients of a filter used in the convolution processing unit, weights used in the affine processing unit, and the like, and these setting values are used, for example, as a multiplier in multiplication in the processing unit.

The setting value notification unit 18 transmits the setting value information 17 stored in the storage unit 15 to the inference device 20.

Next, the inference device 20 will be described in detail.

Figure 3:
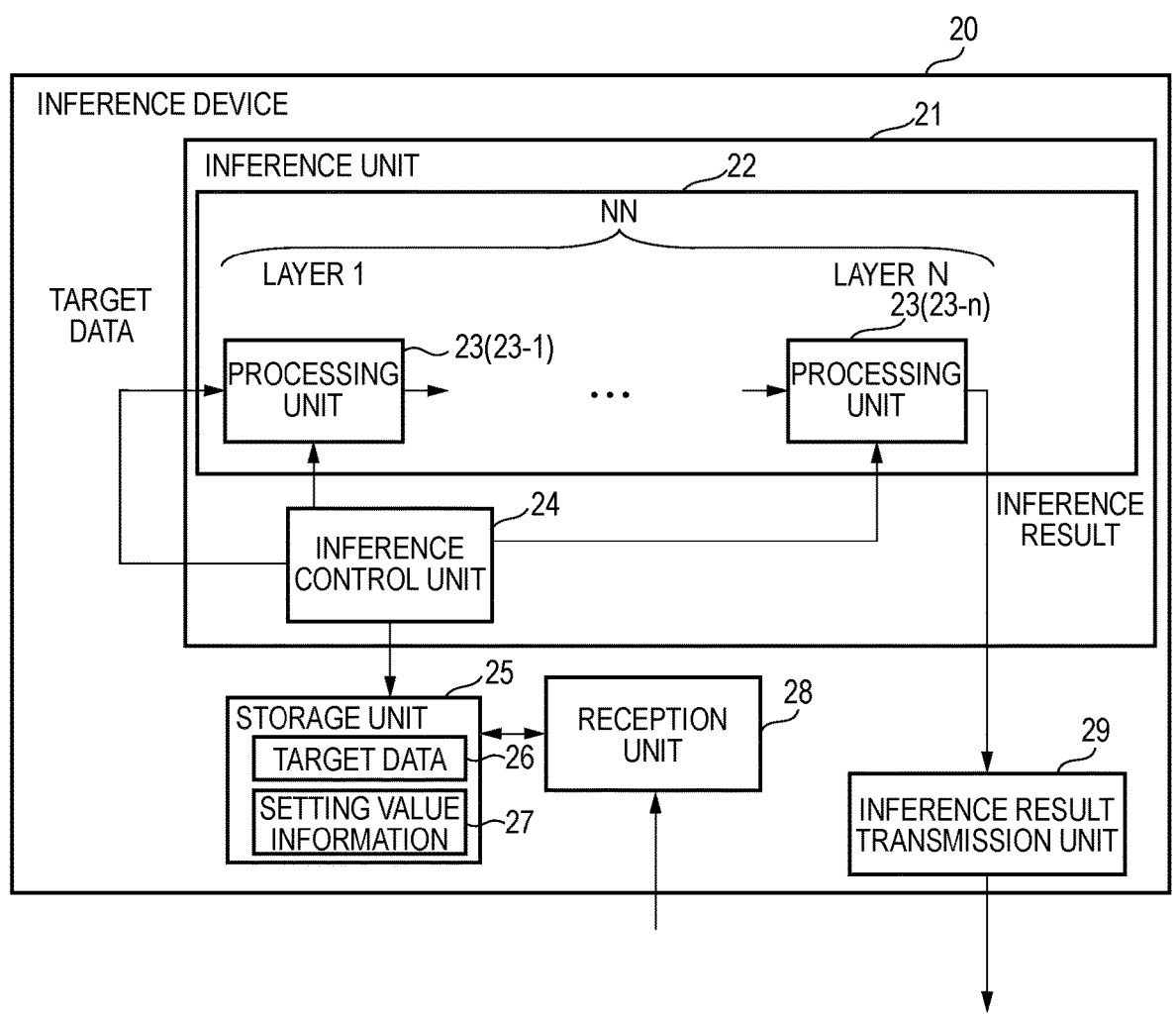
FIG. 3 is a functional configuration diagram illustrating an inference device according to the embodiment.

FIG. 3 is a functional configuration diagram of the inference device according to the embodiment.

The inference device 20 includes an inference unit 21 as an example of a process execution unit, a storage unit 25, a reception unit 28 as an example of an input unit, and an inference result transmission unit 29.

The inference unit 21 includes a neural network model 22 and an inference control unit 24 as an example of a multiplication value adjustment unit.

The neural network model 22 is a neural network model for executing a predetermined inference processing by using encrypted data obtained by encryption based on homomorphic encryption (for example, Paillier encryption or lifted-ElGamal encryption) as an input and outputting an inference result.

The neural network model 22 includes one or more processing layers (layers). In the embodiment, the neural network model 22 is configured to execute processes corresponding to the neural network model 12 of the learning device 10 on the encrypted data, and for example, each processing unit 13 of the neural network 12 corresponds to each processing unit 23 of the neural network 22. In the example of FIG. 3, the neural network model 22 includes layers 1 to N. A process (partial process) in each layer is executed by each processing unit 23. The neural network model 22 may be, for example, a model of executing the inference processing for inferring what image data to be processed represents (for example, which of a person, a dog, a cat, and the like is included) and outputting the inference result. The number of layers in the neural network model 22 and the type and content of the partial process to be executed in each layer can be arbitrarily set.

As the processing unit 23 constituting the layer of the neural network model 22, there are the convolution processing unit for performing the convolution process on input image data by using each of the plurality of pieces of filter data (an example of the setting values), the activation function unit for executing the process for converting input data by the activation function, the pooling processing unit for executing the process for down-sampling the input data, the affine processing unit for executing the affine conversion process on the input data, and the SoftMax processing unit for executing the process by the SoftMax function on the input data.

The inference control unit 24 sets the neural network model 22 based on setting value information 27 stored in the storage unit 25, that is, sets the coefficients and the like in the processing unit 23 of the processing layer. In the embodiment, to the processing unit 23 (multiplication corresponding processing unit) corresponding to the processing unit 13 of the learning device 10 that executes the process of multiplying by a number other than an integer, the inference control unit 24 sets the adjustment multiplication value adjusted to an integer by multiplying the value indicated by the setting value information 27 by a predetermined adjustment value (for example, a number larger than 1) regarding the present processing unit 23. In addition, when the result of multiplying the setting value by the adjustment value is not an integer, for example, an integer close to the value may be used as the adjustment multiplication value. Thus, in the processing unit 23, a calculation in the ciphertext space corresponding to the process of multiplying the plaintext data by the adjustment multiplication value is performed on the encrypted data (first encrypted data) input from the preceding stage. In other words, the processing unit 23 performs a calculation of multiplying by a number that is larger by a multiple of the adjustment value (substantially a multiple of the adjustment value if the value obtained by multiplying the setting value by the adjustment value is not an integer) than that of the corresponding processing unit 13. For example, when the encrypted data input to a certain processing unit 23 is encrypted data obtained by encrypting the plaintext data input to the corresponding processing unit 13, when the processing result of the encrypted data output from the processing unit 23 is decrypted, the processing result becomes a value of the processing result by the processing unit 13 multiplied by the adjustment value.

For example, if the setting value (corresponding to the setting value obtained by learning in the learning device 10) transmitted from the learning device 10 is data in a floating-point format, the inference control unit 24 may obtain the adjustment multiplication value by adjusting to an integer by multiplying the adjustment value after converting the setting value into data in a fixed point format having a predetermined number of bits. Here, the adjustment value may be an adjustment value of the power of 2 that can adjust data in a fixed point format having a predetermined number of bits into an integer, and in this case, it is possible to certainly adjust the adjustment multiplication value into an integer. In addition, if the setting value (corresponding to the setting value obtained by learning in the learning device 10) transmitted from the learning device 10 is data in a fixed point format, the adjustment multiplication value may be adjusted to an integer by multiplying the adjustment value.

Herein, the homomorphic encryption used in the embodiment will be described. In the present example, Paillier encryption, which is an additive homomorphic encryption, will be described as an example.

When processes related to the encryption are performed, various settings as follows are determined in advance. That is, secure prime numbers p and q used in the encryption are prepared. In addition, procedures and cautions in determining the prime numbers may be the same as the RSA encryption. In addition, it is assumed that N=p×q. In addition, k is arbitrarily set within the range of 0≤k≤N−1. It is assumed that g=1+kN. Herein, p and q are secret keys, and g and N are public keys and also system parameters.

For example, if the plaintext data are A and B (0≤A≤N−1, 0≤B≤N−1), the encrypted data $e_A$ and $e_B$ obtained by encrypting the plaintext data are expressed by the following Equations (1) and (2).

$$e_A = g^A \times r_1^N \bmod N^2 \quad (1)$$

$$e_B = g^B \times r_2^N \bmod N^2 \quad (2)$$

Herein, $r_1$ (0≤$r_1$≤N−1) and $r_2$ (0≤$r_2$≤N−1) are random numbers.

Regarding the encrypted data of the Paillier encryption, a calculation corresponding to the sum calculation between the plaintext data can be executed as multiplication of the encrypted data.

The multiplication of the encrypted data, that is, $e_A \times e_B$, is as expressed in Equation (3).

$$\begin{aligned} e_A \times e_B &= g^A \times g^B \times r_1^N \times r_2^N \bmod N^2 \\ &= g^{A+B} \times r_1^N \times r_2^N \bmod N^2 \\ &= e_{A+B} \end{aligned} \quad (3)$$

When $e_{A+B}$ expressed in Equation (3) is decrypted, $e_{A+B}$ becomes A+B. Therefore, it can be understood that the multiplication of the encrypted data corresponds to the sum calculation of the plaintext data.

In addition, regarding the encrypted data of the Paillier encryption, a calculation corresponding to the multiplication of the plaintext data by the integer of the plaintext data can be executed.

A×C, which is the multiplication of the plaintext data A and integer C, corresponds to the sum calculation of adding A up C times. Therefore, by performing the multiplication of the encrypted data for each of the sum calculations, it is possible to execute the calculation corresponding to the multiplication of the plaintext data A and the integer C by the encrypted data.

More specifically, $e_A \times e_A \times \ldots$, that is, cumulative multiplication (multiplication the integer C times) of the encrypted data may be performed as expressed in Equation (4).

$$e_A \times e_A \times \ldots = e_{A+A+\ldots} = e_{AC} \quad (4)$$

When $e_{AC}$ illustrated in Equation (4) is decrypted, $e_{AC}$ becomes AC, which is a result of the multiplication of the plaintext data A and the integer C. Therefore, it can be understood that the calculation of cumulatively multiplying the same encrypted data of the Paillier encryption is the calculation corresponding to the multiplication of the plaintext data and the integer of the plaintext data.

In addition, the inference control unit 24 inputs target data 26, which is data to be processed, to the neural network model 22 and causes the neural network model 22 to execute the inference processing. In the embodiment, the target data 26 is encrypted data encrypted based on homomorphic encryption.

The storage unit 25 stores the target data 26 to be subjected to the inference processing in the neural network model 22 of the inference unit 21 and the setting value information 27 which is information on the setting values such as the coefficients and the like of the neural network model 22. As the setting values included in the setting value information 27, there are, for example, the coefficients, weights, and the like of the filter used as the multiplier in the processing unit 23.

The reception unit 28 receives the setting value information transmitted from the learning device 10 and stores the setting value information in the storage unit 25. In addition, the reception unit 28 receives the encrypted target data 26 transmitted from the client device 30 and stores the encrypted target data 26 in the storage unit 25.

The inference result transmission unit 29 transmits the result of the inference processing by the neural network model 22 of the inference unit 21, that is, the inference result (inference result (adjustment included)) including the adjustment by the adjustment value to the client device 30.

Next, the client device 30 will be described in detail.

Figure 4:
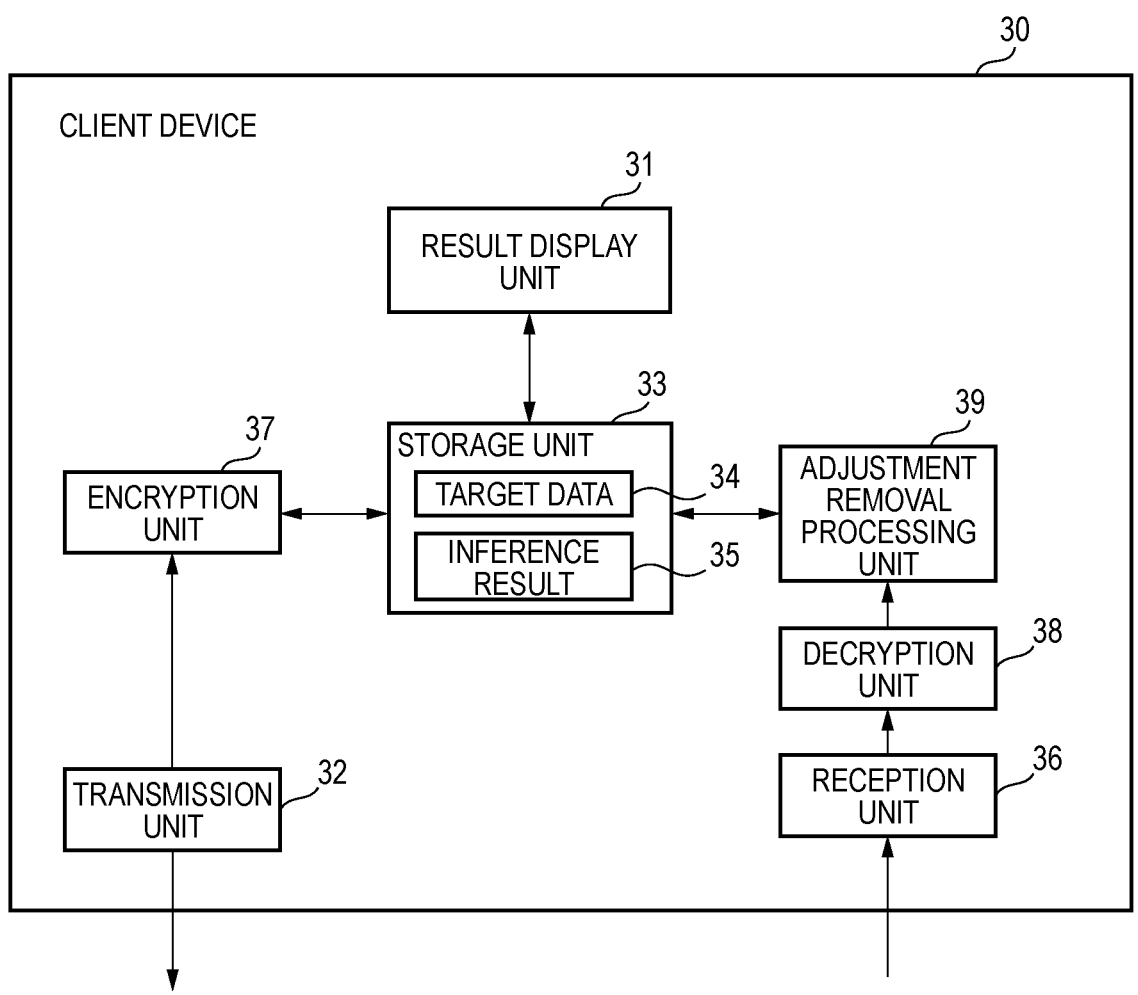
FIG. 4 is a functional configuration diagram illustrating a client device according to the embodiment.

FIG. 4 is a functional configuration diagram of the client device according to the embodiment.

The client device 30 includes a result display unit 31, a transmission unit 32, a storage unit 33, a reception unit 36 as an example of a processing result reception unit, an encryption unit 37, a decryption unit 38, and an adjustment removal processing unit 39.

The storage unit 33 stores target data 34 which is the plaintext data on which the inference processing is executed and inference result 35 of the inference processing. In addition, the inference result 35 is stored if the inference result is transmitted from the inference device 20 and a predetermined process is performed, and the inference result 35 does not exist in the inference result regarding the target data 34 on which the inference processing by the inference device 20 is not performed.

The encryption unit 37 encrypts the unencrypted target data 34 stored in the storage unit 33 by the homomorphic encryption (for example, Paillier encryption) to obtain encrypted data, and transmits the encrypted data to the transmission unit 32.

The transmission unit 32 transmits the encrypted data transferred from the encryption unit 37 to the inference device 20 as the target data of the inference processing. The reception unit 36 receives the inference result (adjustment included) of the inference processing from the inference device 20, and transfers the inference result (adjustment included) to the decryption unit 38.

The decryption unit 38 receives the inference result (adjustment included) transferred from the reception unit 36, performs decryption corresponding to the encryption method of the encryption unit 37 on the inference result (adjustment included) and transfers the decrypted inference result (adjustment included) to the adjustment removal processing unit 39.

The adjustment removal processing unit 39 generates a final inference result (inference result (final)) by executing a process of removing the adjustment from the inference result on the decrypted inference result (adjustment included) based on the multiplier adjusted by each adjustment value in the inference device 20 (for example, a value multiplied by the adjustment value if cumulatively multiplication was performed) and stores the generated inference result (final) in the storage unit 33. Since the multiplier adjusted by each adjustment value in the inference device 20 is specified by the configuration of the inference device 20, the multiplier may be set in the adjustment removal processing unit 39 in advance or may be acquired from the learning device 10 and the inference device 20 in advance before processing and be set in the adjustment removal processing unit 39.

The result display unit 31 displays and outputs various types of information based on the inference result 35 stored in the storage unit 33. The result display unit 31 may display the inference result 35 as it is or may execute a predetermined process based on the inference result 35 and display the execution result.

Next, a more specific example of the processing system 1 will be described.

Figure 5:
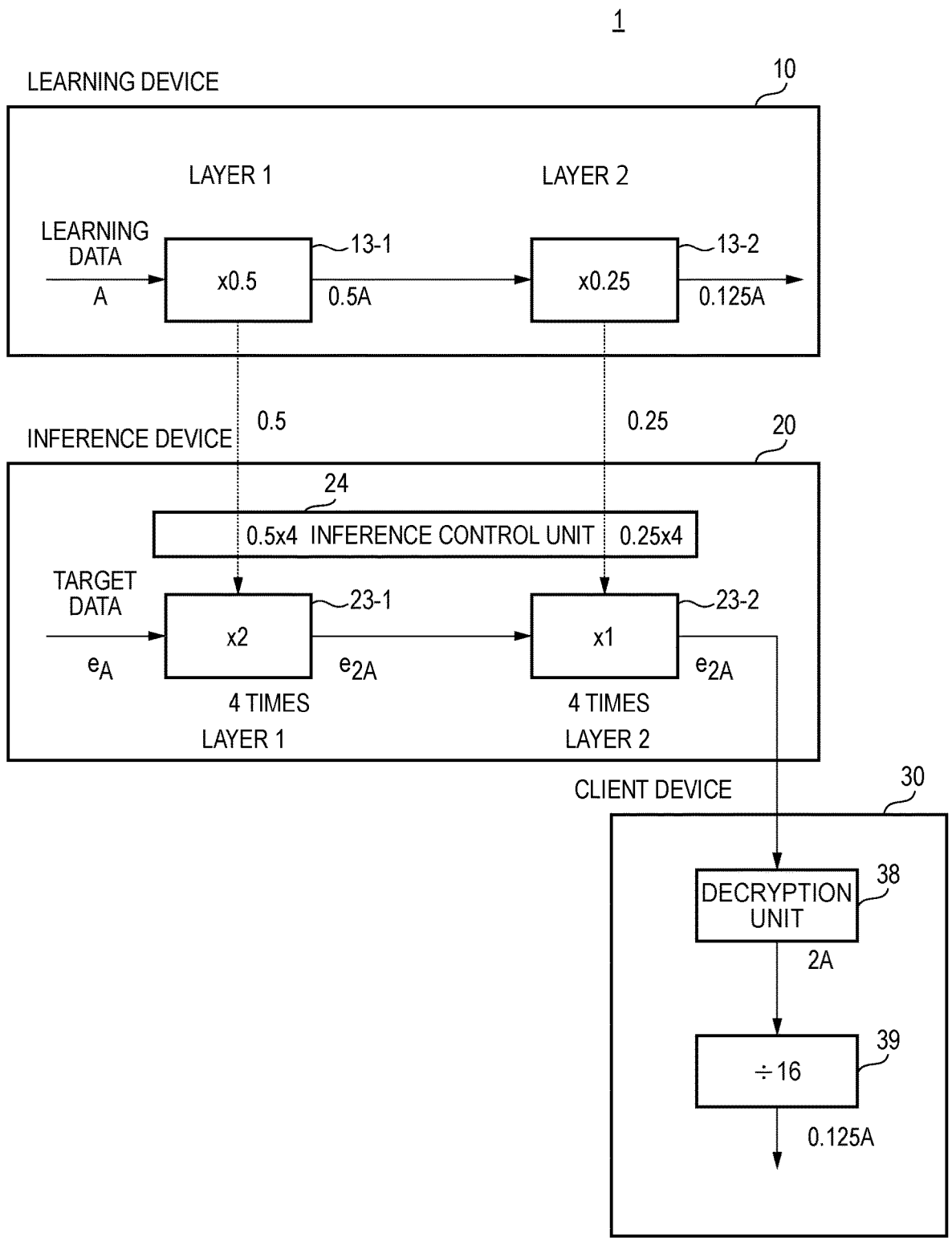
FIG. 5 is a functional configuration diagram illustrating an example of the processing system according to the embodiment.

FIG. 5 is a functional configuration diagram of an example of the processing system according to the embodiment.

The learning device 10 includes a processing unit 13-1 of a processing layer 1 and a processing unit 13-2 of a processing layer 2.

The processing unit 13-1 performs a multiplication process of multiplying the input data by 0.5. In addition, 0.5 is obtained as a setting value used for calculation in the processing unit 13-1 by learning of the learning device 10. For example, when plaintext data A is input to the processing unit 13-1, the processing unit 13-1 calculates A×0.5 and outputs 0.5 A. The learned setting value (0.5 in the present example) for the processing unit 13-1 is transmitted to the inference device 20 by the setting value notification unit 18.

The processing unit 13-2 performs a multiplication process of multiplying the input data by 0.25 and outputs the multiplication result. In addition, 0.25 is obtained as a setting value used for calculation in the processing unit 13-2 by learning of the learning device 10. For example, when plaintext data 0.5 A output from the processing unit 13-1 is input to the processing unit 13-2, the processing unit 13-2 calculates 0.5 A×0.25 and outputs 0.125 A. In addition, the learned setting value (0.25 in the present example) for the processing unit 13-2 is transmitted to the inference device 20 by the setting value notification unit 18.

The inference device 20 includes a processing unit 23-1 of a processing layer 1, a processing unit 23-2 of a processing layer 2, and the inference control unit 24.

The inference control unit 24 adjusts each setting value transmitted from the learning device 10 into integers by multiplying the adjustment value corresponding to each of the processing units 23-1 and 23-2 to generate an adjustment multiplication value and sets the adjustment multiplication value in each of the processing units 23-1 and 23-2.

In the present example, the adjustment value of the processing unit 23-1 is 4, and the adjustment value of the processing unit 23-2 is 4. In the present example, the inference control unit 24 multiplies the adjustment value 0.5 for the processing unit 23-1 transmitted from the learning device 10 by the adjustment value 4 of the processing unit 23-1 to generate the adjustment multiplication value 2 and sets the adjustment multiplication value 2 in the processing unit 23-1. In addition, the inference control unit 24 multiplies the adjustment value 0.25 for the processing unit 23-2 transmitted from the learning device 10 by the adjustment value 4 of the processing unit 23-2 to generate the adjustment multiplication value 1 and sets the adjustment multiplication value 1 in the processing unit 23-2.

The processing unit 23-1 performs a calculation (corresponding calculation) in the ciphertext space corresponding to the process of multiplying the plaintext data by the set adjustment multiplication value (2 in the drawing) on the input encrypted data. For example, when the Paillier encryption is used, the processing unit 23-1 performs a calculation of cumulatively multiplying the input encrypted data by the adjustment multiplication value as a corresponding calculation. In the present example, the processing unit 23-1 cumulatively multiplies (here, twice) the input encrypted data $e_A$ ($e_A$ indicates the value obtained by encrypting the plaintext data A) by the adjustment multiplication value and calculates and outputs $e_{2A}$. When $e_{2A}$ is decrypted, $e_{2A}$ becomes the plaintext data 2A. Therefore, the output result of the processing unit 23-1 is encrypted data which becomes a value obtained by multiplying 0.5 A which is the output result of the processing unit 13-1 by the adjustment value (4 times).

The processing unit 23-2 performs a calculation (corresponding calculation) in the ciphertext space corresponding to the process of multiplying the plaintext data by the set adjustment multiplication value (1 in the drawing) on the input encrypted data. For example, when the Paillier encryption is used, the processing unit 23-1 performs a calculation of cumulatively multiplying the input encrypted data by the adjustment multiplication value as a corresponding calculation. In the present example, the processing unit 23-2 calculates and outputs $e_{2A}$ by cumulatively multiplying the input encrypted data $e_{2A}$ by the adjustment multiplication value (once). When $e_{2A}$ is decrypted, $e_{2A}$ becomes plaintext data 2A. Therefore, the output result of the processing unit 23-2 is encrypted data having a multiplied value (16 times) obtained by multiplying 0.125 A which is the output result of the processing unit 13-2 by the adjustment value (4) of the processing unit 23-1 and the adjustment value (4) of the processing unit 23-2. The processing result of the processing unit 23-2 (the inference result including the content of the multiplication by the adjustment value, referred to as the inference result (adjustment included)) is transmitted to the client device 30 by the inference result transmission unit 29.

In the client device 30, the decryption unit 38 acquires the inference result (adjustment included) which is the encrypted data transmitted from the inference device 20, performs the decryption corresponding to the encryption method of the encrypted data to obtain the inference result (adjustment included) of the plaintext data, and transfers the inference result (adjustment included) to the adjustment removal processing unit 39. For example, in the present example, the decryption unit 38 decrypts $e_{2A}$ to obtain 2A and transfers 2A to the adjustment removal processing unit 39.

The adjustment removal processing unit 39 generates the inference result (0.125 A) from which the adjustment has been removed, by dividing the inference result (adjustment included) (2 A in this example) of the plaintext data received from the decryption unit 38 by a multiplier (in this example, 4×4=16). As a result, in the client device 30, it is possible to obtain the same value as the execution result of executing the processes of the processing units 13-1 and 13-2 of the learning device 10 on the plaintext data.

As described above, in the processing system 1, in the inference device 20, it is possible to perform the processes while maintaining a secret state by using the encrypted data, and in the client device 30, it is possible to obtain the same result as the result obtained by performing the processes on the plaintext data.

Next, the processing operations in the processing system 1 according to the embodiment will be described.

Figure 6:
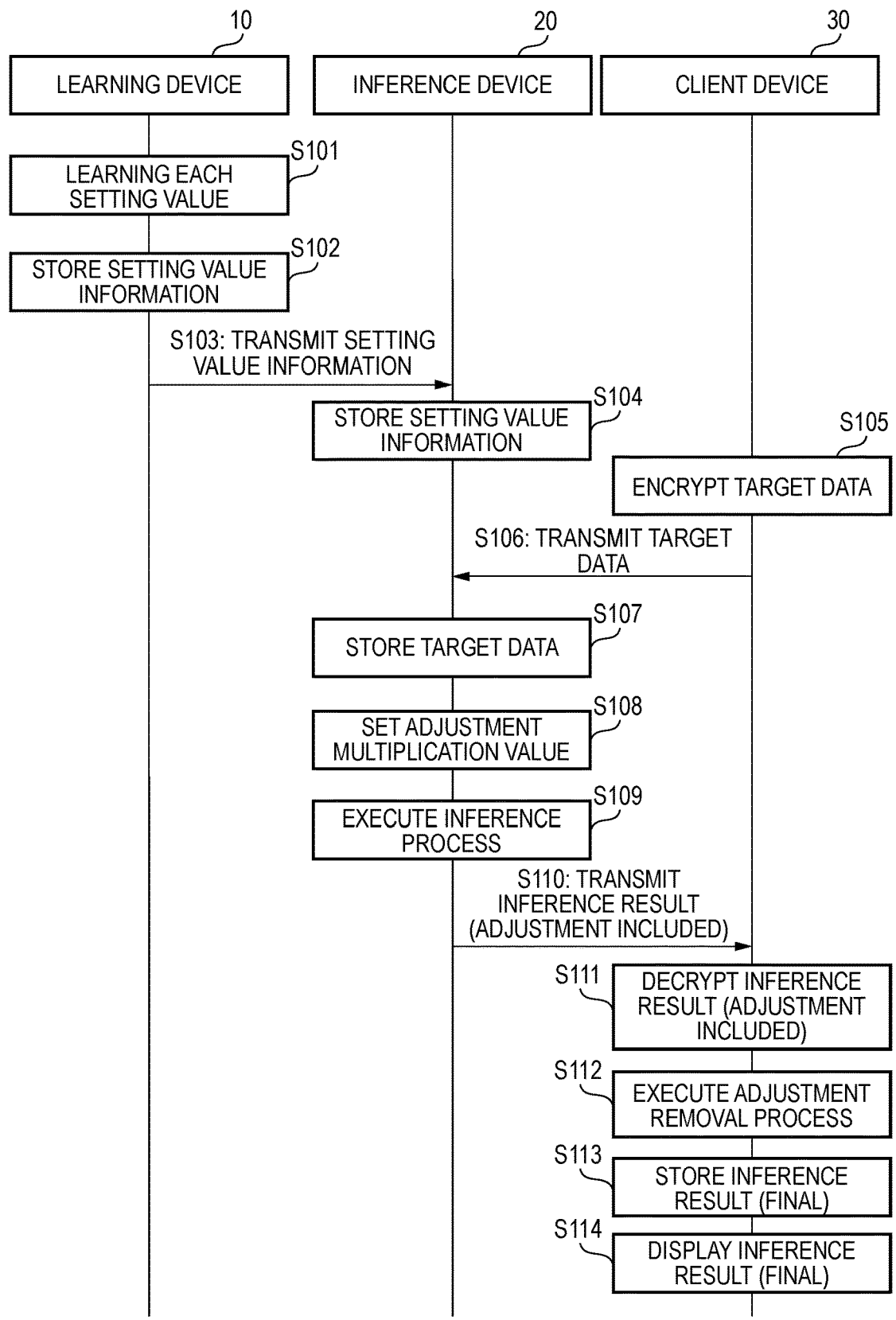
FIG. 6 is a sequence diagram illustrating operations illustrating the processing system according to the embodiment.

FIG. 6 is a sequence diagram illustrating operations of the processing system according to the embodiment.

The learning control unit 14 of the learning device 10 causes the neural network model 12 of the learning unit 11 to execute the inference processing by using the learning data 16 stored in the storage unit 15, so that the learning of various setting values of the processing unit 13 of the neural network model 12 is performed (S101). Next, the learning control unit 14 stores the setting value information on the setting value obtained by learning in the storage unit 15 (S102).

Next, the setting value notification unit 18 reads out the setting value information 17 stored in the storage unit 15 and transmits the setting value information 17 to the inference device 20 (S103).

The reception unit 28 of the inference device 20 receives the setting value information 17 transmitted from the learning device 10 and stores the setting value information 17 in the storage unit 25 (S104). On the other hand, the encryption unit 37 of the client device 30 acquires the target data 34 from the storage unit 33, encrypts the target data 34 with predetermined encryption (S105), and the transmission unit 32 transmits the encrypted target data to the inference device 20 (S106).

The reception unit 28 of the inference device 20 receives the target data to be inferred from the client device 30 and stores the target data in the storage unit 25 (S107). In addition, any one of timing of receiving the setting value information 17 and timing of receiving the target data may be ahead of the other, and the important point is that both are completed before the inference processing is executed.

The inference control unit 24 of the inference device 20 acquires the setting value information 27 from the storage unit 25, generates an adjustment multiplication value by multiplying the setting value for each processing unit 23 of the setting value information 27 by the adjustment value corresponding to each processing unit 23, and sets the adjustment multiplication value in each processing unit 23 (S108). Then, the inference control unit 24 reads out the target data 26 which is the encrypted data from the storage unit 25 and inputs the target data 26 to the processing unit 23 of the first processing layer (layer 1) of the neural network model 22. As a result, in the neural network model 22, the inference processing is performed on the target data 26, and the inference result (adjustment included) is output from the processing unit 23 of the last processing layer (layer N) to the inference result transmission unit 29 (S109).

Next, the inference result transmission unit 29 of the inference device 20 transmits the inference result (adjustment included) transferred from the neural network model 22 to the client device 30 that requested the inference processing of the target data (S110).

The reception unit 36 of the client device 30 receives the inference result (adjustment included) from the inference device 20, transfers the inference result (adjustment included) to the decryption unit 38, and the decryption unit 38 decrypts the inference result (adjustment included) and transfers the decrypted inference result (adjustment included) to the adjustment removal processing unit 39 (S111). The adjustment removal processing unit 39 executes the process of removing the adjustment on the decrypted inference result (adjustment included) based on the multiplier adjusted by each reference value in the inference device 20, so that the final inference result (inference result (final)) is generated (S112), and the generated inference result (final) 35 is stored in the storage unit 33 (S113). After that, the result display unit 31 displays and outputs the inference result based on the inference result 35 stored in the storage unit 33 (S114).

As described above, according to the processing system of the embodiment, even if a multiplication process of multiplying the plaintext data by a number other than an integer is required, the inference device 20 side performs the process corresponding to the multiplication process of multiplying the plaintext data by an integer on the encrypted data. For this reason, regarding the processes including the multiplication process of multiplying the plaintext by a number other than an integer, the inference device 20 side can perform the process while maintaining the secret state by the encrypted data. Therefore, it is possible to appropriately prevent the leakage of information from the inference device 20.

Each of the learning device 10, the inference device 20, and the client device 30 described above can be configured by a computer device.

Figure 7:
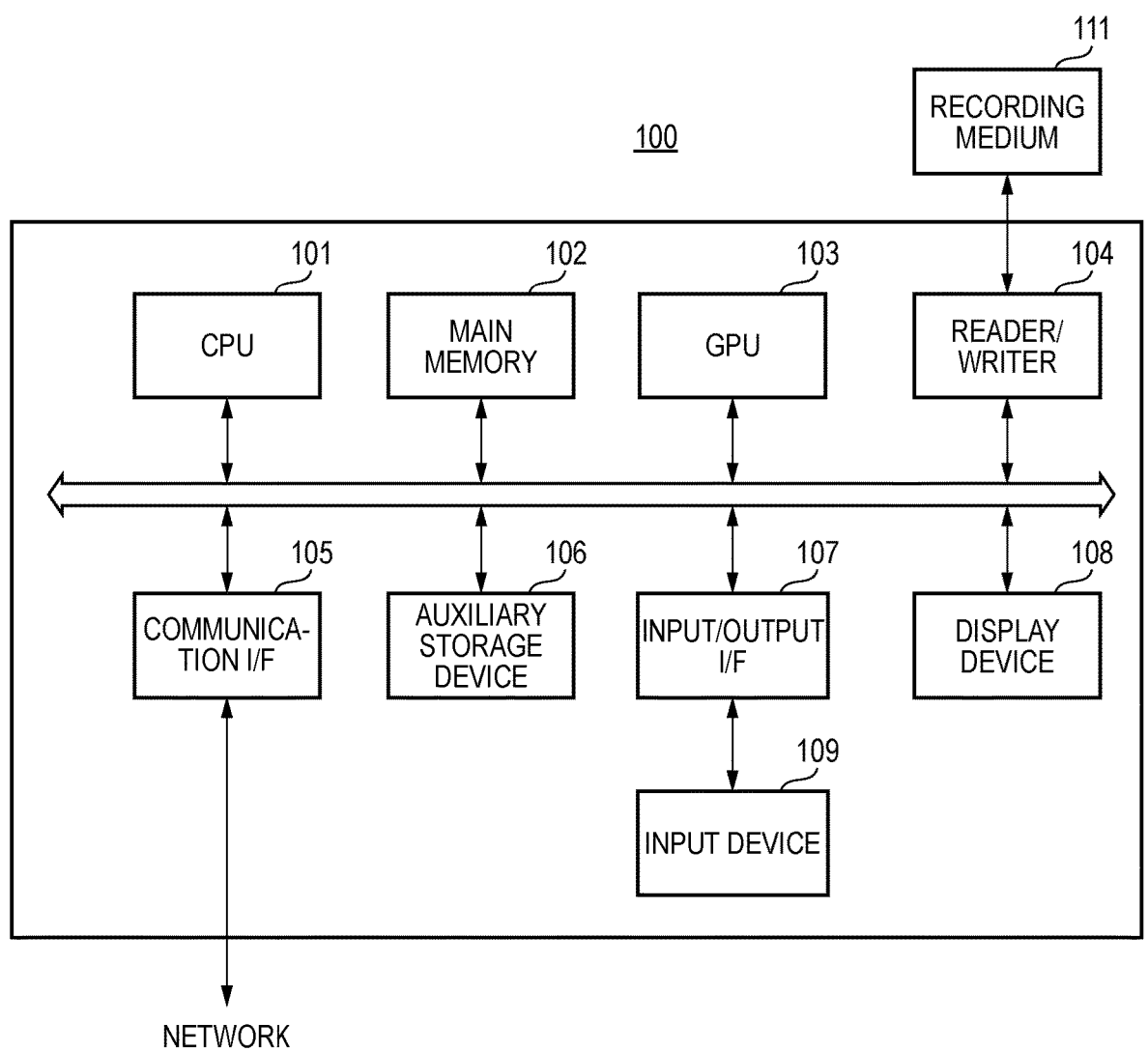
FIG. 7 is a configuration diagram illustrating a computer device according to the embodiment.
Figure 8:
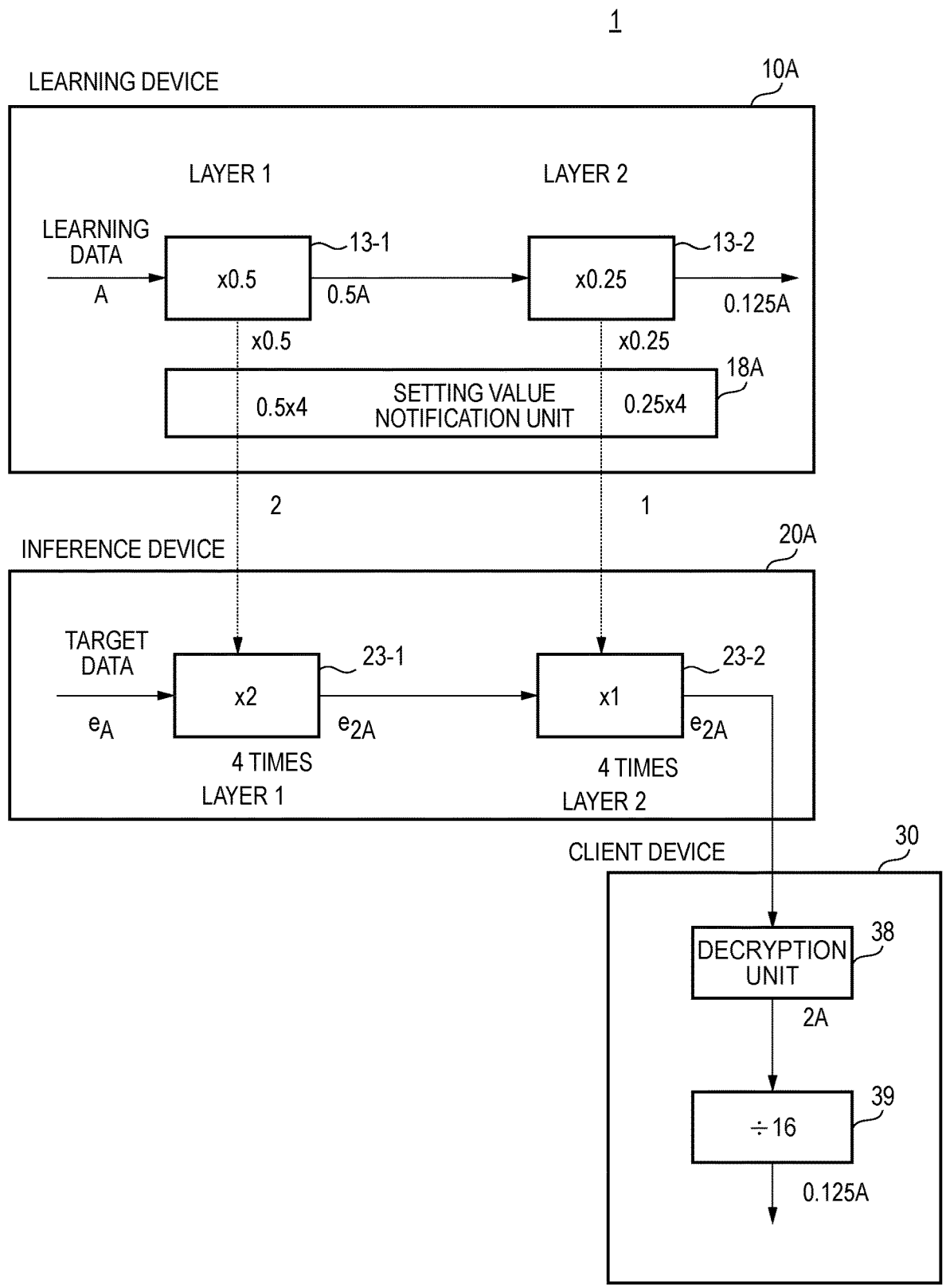
FIG. 8 is a functional configuration diagram illustrating a processing system according to a modified example.

FIG. 7 is a configuration diagram illustrating an embodiment of the computer device. In addition, in the embodiment, the learning device 10, the inference device 20, and the client device 30 are configured as separate computer devices, and these computer devices may have the same configuration. In the following description, for the convenience, the computer device constituting each of the learning device 10, the inference device 20, and the client device 30 will be described by using the computer device illustrated in FIG. 7.

The computer device 100 includes, for example, a central processing unit (CPU) 101, a main memory 102, a graphics processing unit (GPU) 103, a reader/writer 104, a communication interface (communication I/F) 105, an auxiliary storage device 106, an input/output interface (input/output I/F) 107, a display device 108, and an input device 109. The CPU 101, the main memory 102, the GPU 103, the reader/writer 104, the communication I/F 105, the auxiliary storage device 106, the input/output I/F 107, and the display device 108 are connected via a bus 110. Each of the learning device 10, the inference device 20, and the client device 30 is configured by appropriately selecting some or all of the components described in the computer device 100.

Herein, at least one of the main memory 102 and the auxiliary storage device 106 functions as the storage unit 15 of the learning device 10, the storage unit 25 of the inference device 20, and the storage unit 33 of the client device 30.

The CPU 101 of the computer device 100 of the learning device 10 totally controls the entire learning device 10. The CPU 101 executes various processes by reading out the program stored in the auxiliary storage device 106 to the main memory 102 and executing the program. In the learning device 10, the CPU 101 executes the processing program stored in the auxiliary storage device 106 to constitute, for example, the neural network model 12 of the learning unit 11. In the computer device 100 of the inference device 20, the CPU 101 executes the processing program stored in the auxiliary storage device 106 to constitute, for example, the neural network model 22 of the inference unit 21. In the computer device 100 of the client device 30, the CPU 101 executes the processing program stored in the auxiliary storage device 106 to constitute, for example, the result display unit 31, the encryption unit 37, the decryption unit 38, and the adjustment removal processing unit 39. The CPU 101 of the computer device 100 of the inference device 20 may have better processing performance than the CPU 101 of the computer device 100 of the client device 30.

The main memory 102 is, for example, a RAM, a ROM or the like and stores programs (processing programs and the like) to be executed by the CPU 101 and various types of information. The auxiliary storage device 106 is, for example, a non-transitory storage device (nonvolatile storage device) such as a hard disk drive (HDD), a solid state drive (SSD) and stores the programs to be executed by the CPU 101 and various types of information. In the computer device 100 of the learning device 10, the main memory 102 stores, for example, the learning data 16 and the setting value information 17. In the computer device 100 of the inference device 20, the main memory 102 stores, for example, the target data 26 and the setting value information 27. In the computer device 100 of the client device 30, the main memory 102 stores, for example, the target data 34 and the inference result 35.

The GPU 103 is, for example, a processor suitable for executing a specific process such as image process and is suitable for executing, for example, a process performed in parallel. In the embodiment, the GPU 103 executes a predetermined process according to an instruction of the CPU 101. In the computer device 100 of the learning device 10, the GPU 103 may constitute at least one processing unit 13. In the computer device 100 of the inference device 20, the GPU 103 may constitute at least one processing unit 23.

The reader/writer 104 is capable of attaching and detaching the recording medium 111, and reads out data from the recording medium 111 and writes data in the recording medium 111. As the recording medium 111, there are exemplified non-transitory recording media (nonvolatile recording media) such as an SD memory card, a floppy disk (FD: registered trademark), a CD, a DVD, a BD (registered trademark), and a flash memory. In the embodiment, a processing program may be stored in the recording medium 111, and the processing program may be read out by the reader/writer 104 to be used. In the computer device 100 of the learning device 10, the learning data may be stored in the recording medium 111, and the learning data may be read out by the reader/writer 104 to be used. In the computer device 100 of the client device 30, the target data may be stored in the recording medium 111, and the target data may be read out by the reader/writer 104 to be stored in the storage unit 33.

The communication I/F 105 is connected to the networks 40 and 50 and performs data transmission and reception regarding other devices connected to the networks 40 and 50. For example, the learning device 10 transmits the setting value information to the inference device 20 connected to the network 40 via the communication I/F 105. Each of the setting value notification unit 18 of the learning device 10, the reception unit 28 and the inference result transmission unit 29 of the inference device 20, and the transmission unit 32 and the reception unit 36 of the client device 30 is configured by the communication I/F 105 and the CPU 101 of the computer device 100 of each unit.

For example, the input/output I/F 107 is connected to the input device 109 such as a mouse, a keyboard, or the like. In the computer device 100 of the learning device 10, the input/output I/F 107 receives an operation input by an administrator of the learning device 10 by using the input device 109. In the computer device 100 of the inference device 20, the input/output I/F 107 receives an operation input by an administrator of the inference device 20 by using the input device 109. In the computer device 100 of the client device 30, the input/output I/F 107 receives an operation input by a user of the client device 30 by using the input device 109.

The display device 108 is, for example, a display device such as a liquid crystal display and displays and outputs various types of information.

Next, a processing system according to a modified example will be described.

Compared to the processing system illustrated in FIG. 5, the processing system according to the modified example is provided with a learning device 10A instead of the learning device 10 and is provided with an inference device 20A instead of the inference device 20.

The learning device 10A includes a setting notification unit 18A instead of the setting value notification unit 18. In addition to the function of the setting value notification unit 18, the setting notification unit 18A calculates the adjustment multiplication value by multiplying the learned setting value (coefficient) that is the multiplier of the processing unit 13 by the adjustment value in the corresponding processing unit 23 on the inference device 20A side and transmits the adjustment multiplication value to be set in the corresponding processing unit 23 of the inference device 20A.

In the inference device 20A, the reception unit 28 as an example of the adjustment multiplication value reception unit stores the adjustment multiplication value transmitted from the learning device 10A in the storage unit 25, and the inference control unit 24 acquires the adjustment multiplication value to be set in each processing unit 23 from the storage unit 25 and sets the adjustment multiplication value in each processing unit 23. Each processing unit 23 executes the calculation process of the encrypted data by using the set adjustment multiplication value.

According to the present processing system 1, since the adjustment multiplication value acquired from the learning device 10A can be used as it is on the inference device 20A side, the processing load is reduced.

The present invention is not limited to the above-described embodiments, but can be appropriately modified and implemented without departing from the spirit of the present invention.

For example, in the above-described embodiment, a learning device and an inference device for executing the processes by using the neural network model including two processing layers (processing units) are exemplified, but the present invention is not limited thereto. The present invention can be similarly applied to a learning device and an inference device for executing processes by using a neural network model including only one processing layer (processing unit) or a neural network model including three or more processing layers (processing units).

In the above-described embodiment, the example applied to a processing apparatus that executes a process using a neural network model is described, but the present invention is not limited thereto. For example, the present invention can be similarly applied to a processing apparatus that executes a process without using a neural network model.

In the above-described embodiment, as an example of homomorphic encryption, additive homomorphic encryption is taken, but the present invention is not limited thereto. Completely homomorphic encryption or somewhat homomorphic encryption may be exemplified.

In the above-described embodiment, at least a portion of the functional units configured by executing the program by the CPU 101 of the learning device 10 (10A), the inference device 20 (20A), or the client device 30 may include another processor or a hardware circuit for executing a specific process. The processing unit 13 including the GPU 103 of the learning device 10 (10A) may include the CPU 101, or may include another hardware circuit. The processing unit 23 including the GPU 103 of the inference device 20 (20A) may include the CPU 101 or may include another hardware circuit.

In the above-described embodiment, the example where the reception unit 28 is taken as an example of the input unit that receives the target data is described, but the present invention is not limited thereto. For example, the input unit may be a reader/writer that reads out the target data from a recording medium that stores the target data or may be a camera that captures image data that becomes the target data.

In the above-described embodiment, the example where the learning device 10 (10A) and the inference device 20 (20A) are configured as separate hardware is described, but the present invention is not limited thereto. The learning device and the inference device may be configured by the same hardware.

In the above-described embodiment, the example where the inference device 20 (20A) and the client device 30 are configured as separate hardware is described, but the present invention is not limited thereto. For example, if the process capability of the client device 30 is sufficient, the inference device 20 (20A) and the client device 30 may be configured by the same hardware.

What is claimed is:

1. A processing apparatus comprising:
   at least one non-transitory storage device configured to store one or more programs; and
   at least one hardware processor configured execute the one or more programs and control the processing apparatus to function as:
      an input unit that receives encrypted data based on homomorphic encryption as an input; and
      a process execution unit that executes a predetermined process by using the encrypted data while maintaining a secret state by encryption and includes one or more processing units, wherein
   at least one of the processing units is a multiplication processing unit for executing a calculation in a ciphertext space, and
   the multiplication processing unit executes the calculation in the ciphertext space of multiplying the encrypted data input from a preceding stage by an adjustment multiplication value and outputs resulting data,
   the calculation corresponding to a processing of multiplying plaintext data by a predetermined multiplier, and the adjustment multiplication value being obtained by multiplying the predetermined multiplier by a predetermined adjustment value for performing an integer processing in which a setting value from a learning device is adjusted into an integer.

2. The processing apparatus according to claim 1, wherein the at least one hardware processor is further configured to function as
   a multiplier reception unit that receives the predetermined multiplier, and
   a multiplication value adjustment unit that calculates the adjustment multiplication value by multiplying the predetermined multiplier received by the predetermined adjustment value.

3. The processing apparatus according to claim 1, wherein the at least one hardware processor is further configured to function as
   an adjustment multiplication value reception unit that receives the adjustment multiplication value obtained by multiplying the predetermined multiplier by the predetermined adjustment value.

4. The processing apparatus according to claim 1, wherein the predetermined multiplier is a number in a floating-point format,
   the predetermined adjustment value is an integer of a power of 2, and
   the adjustment multiplication value is an integer obtained by converting the predetermined multiplier into a fixed point format and multiplying the predetermined multiplier converted into the fixed point format by the predetermined adjustment value.

5. The processing apparatus according to claim 2, wherein the predetermined multiplier is a number in a floating-point format,
   the predetermined adjustment value is an integer of a power of 2, and
   the adjustment multiplication value is an integer obtained by converting the predetermined multiplier into a fixed point format and multiplying the predetermined multiplier converted into the fixed point format by the predetermined adjustment value.

6. The processing apparatus according to claim 3, wherein the predetermined multiplier is a number in a floating-point format,
   the predetermined adjustment value is an integer of a power of 2, and
   the adjustment multiplication value is an integer obtained by converting the predetermined multiplier into a fixed point format and multiplying the predetermined multiplier converted into the fixed point format by the predetermined adjustment value.

7. The processing apparatus according to claim 1, wherein the one or more processing units are one or more processing units constituting a neural network model.

8. The processing apparatus according to claim 1, wherein the homomorphic encryption is additive homomorphic encryption.

9. A processing method by a processing apparatus for executing a predetermined process by using encrypted data based on homomorphic encryption as an input while maintaining a secret state by encryption, the processing apparatus including at least one non-transitory storage device configured to store one or more programs, and at least one hardware processor configured execute the one or more programs and control the processing apparatus to perform the processing method comprising:
 executing a calculation in a ciphertext space of multiplying first encrypted data input from a preceding stage by an adjustment multiplication value, the calculation corresponding to a processing of multiplying the plaintext data by a predetermined multiplier, and the adjustment multiplication value being obtained by multiplying the predetermined multiplier by a predetermined adjustment value for performing integer processing in which a setting value from a learning device is adjusted into an integer; and
 outputting resulting data.

10. A non-transitory computer readable storage medium storing a processing program causing a computer to execute a process, the computer including at least one processor configured to function as an input unit that receives encrypted data based on homomorphic encryption as an input and a process execution unit that executes a predetermined process by using the encrypted data while maintaining a secret state by encryption and includes one or more processing units at least one of which is a multiplication processing unit for executing a calculation in a ciphertext space, the process including:
 executing the calculation in a ciphertext space of multiplying first encrypted data input from a preceding stage by an adjustment multiplication value, the calculation corresponding to a processing of multiplying the plaintext data by a predetermined multiplier, and the adjustment multiplication value being obtained by multiplying the predetermined multiplier by a predetermined adjustment value for performing integer processing in which a setting value from a learning device is adjusted into an integer; and
 outputting resulting data.

11. An encryption processing system comprising:
 a processing apparatus for executing a predetermined process by using encrypted data based on homomorphic encryption as an input while maintaining a secret state by encryption; and
 a result generation apparatus for executing a process for generating a result corresponding to first plaintext data by using a processing result by the processing apparatus as an input, wherein
 the processing apparatus includes at least one non-transitory storage device configured to store one or more programs; and at least one hardware processor configured to execute the one or more programs and control the processing apparatus to function as:
  an input unit that receives the encrypted data, and
  a process execution unit that executes the predetermined process by using the encrypted data and includes one or more processing units at least one of which is a multiplication processing unit for executing a calculation in a ciphertext space, the multiplication processing unit executing the calculation in the ciphertext space of multiplying the encrypted data input from a preceding stage by an adjustment multiplication value and outputs resulting data, the calculation corresponding to a processing of multiplying the plaintext data by a predetermined multiplier, and the adjustment multiplication value being obtained by multiplying the predetermined multiplier by a predetermined adjustment value for performing an integer processing in which a setting value from a learning device is adjusted into an integer, and
 the result generation apparatus includes at least one non-transitory storage device configured to store one or more programs, and at least one hardware processor configured to execute the one or more programs and control the result generation apparatus to function as:
  a processing result reception unit that receives the processing result by the process execution unit of the processing apparatus,
  a decryption unit that decrypts the processing result to obtain second plaintext data, and
  an adjustment removal processing unit that generates the result by executing a process of removing adjustment on the second plaintext data based on the predetermined adjustment value for the multiplication processing unit of the process execution unit.

* * * * *